US012715070B2

(12) United States Patent
Jang et al.

(10) Patent No.: US 12,715,070 B2
(45) Date of Patent: Aug. 25, 2026

(54) LASER CONTROL STRUCTURE AND LASER BONDING METHOD USING THE SAME

(71) Applicant: Electronics and Telecommunications Research Institute, Daejeon (KR)

(72) Inventors: Ki Seok Jang, Daejeon (KR); Yong Sung Eom, Daejeon (KR); Gwang-Mun Choi, Daejeon (KR); Kwang-Seong Choi, Daejeon (KR); Jiho Joo, Daejeon (KR); Seok-Hwan Moon, Daejeon (KR); Chanmi Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1075 days.

(21) Appl. No.: 17/843,504

(22) Filed: Jun. 17, 2022

(65) Prior Publication Data

US 2022/0402070 A1 Dec. 22, 2022

(30) Foreign Application Priority Data

Jun. 21, 2021 (KR) ........................ 10-2021-0080104
Jun. 15, 2022 (KR) ........................ 10-2022-0073094

(51) Int. Cl.
*B23K 26/324* (2014.01)
*B23K 103/00* (2006.01)
(Continued)

(52) U.S. Cl.
CPC ........ *B23K 26/324* (2013.01); *B23K 2101/40* (2018.08); *B23K 2103/20* (2018.08);
(Continued)

(58) Field of Classification Search
None
See application file for complete search history.

(56) References Cited

U.S. PATENT DOCUMENTS 8,610,359 B2 12/2013 Lee
9,916,989 B2 3/2018 Yoon et al.
(Continued)

FOREIGN PATENT DOCUMENTS

CN 102414787 A 4/2012
CN 102890359 A 1/2013
(Continued)

OTHER PUBLICATIONS

Xianchang, He, “Introduction to Ceramic Materials”, Shanghai Science Popularization Press, First Edition, Sep. 2005, (7 Pages in English, 3 Pages in Chinese).

(Continued)

*Primary Examiner* — Elizabeth M Kerr
(74) *Attorney, Agent, or Firm* — NSIP Law

(57) ABSTRACT

A laser bonding method and a laser control structure are provided. The method includes forming bonding portions on a substrate, providing a bonding object and a laser control structure, and irradiating laser light. The laser control structure includes a first substrate having first and second regions. A first thin film laminate, comprising alternating first and second thin film layers, is disposed on the first region. A second thin film laminate, comprising alternating third and fourth thin film layers, is disposed on the second region. Reflectance or absorptivity of the first thin film laminate differs from that of the second thin film laminate based on different thicknesses and numbers of the laminated layers. Accordingly, bonding temperatures are selectively controlled for different regions during a single laser irradiation.

20 Claims, 18 Drawing Sheets

(51) Int. Cl.

| | |
|---|---|
| ***B23K 103/20*** | (2006.01) |
| ***B23K 103/22*** | (2006.01) |
| *B23K 101/40* | (2006.01) |

(52) U.S. Cl.

CPC ...... *B23K 2103/22* (2018.08); *B23K 2103/42* (2018.08); *B23K 2103/52* (2018.08); *B23K 2103/54* (2018.08); *B23K 2103/56* (2018.08)

(56) References Cited

U.S. PATENT DOCUMENTS

| | | | | |
|---|---|---|---|---|
| 10,304,797 | B2 | 5/2019 | Arutinov et al. | |
| 10,593,843 | B2 | 3/2020 | Ichikawa | |
| 11,257,783 | B2 | 2/2022 | Kim et al. | |
| 2008/0044759 | A1* | 2/2008 | Ishibashi | H01L 21/3086 430/311 |
| 2009/0152771 | A1 | 6/2009 | Philippi et al. | |
| 2010/0006625 | A1 | 1/2010 | Eom et al. | |
| 2010/0127190 | A1* | 5/2010 | Straw | B23K 26/18 250/492.3 |
| 2010/0232458 | A1 | 9/2010 | Kim et al. | |
| 2010/0243024 | A1* | 9/2010 | Hashimoto | H10F 77/937 136/244 |
| 2011/0287348 | A1 | 11/2011 | Yoon et al. | |
| 2012/0135602 | A1* | 5/2012 | Shimoi | B23K 26/0622 438/689 |
| 2013/0021556 | A1 | 1/2013 | Nagato et al. | |
| 2014/0367375 | A1* | 12/2014 | Bae | B23K 35/0222 219/635 |
| 2016/0074968 | A1* | 3/2016 | Souter | B23K 26/361 430/5 |
| 2016/0218289 | A1 | 7/2016 | Lee et al. | |
| 2016/0260677 | A1* | 9/2016 | Hsiao | H01L 25/0657 |
| 2019/0027461 | A1* | 1/2019 | Arutinov | H05K 3/3494 |
| 2020/0032013 | A1* | 1/2020 | Park | C08L 83/10 |
| 2021/0088704 | A1 | 3/2021 | RoBbach et al. | |

FOREIGN PATENT DOCUMENTS

| | | | |
|---|---|---|---|
| CN | 106206257 | A | 12/2016 |
| CN | 107690697 | A | 2/2018 |
| CN | 108511575 | A | 9/2018 |
| DE | 10 2007 056 984 | A1 | 5/2009 |
| JP | H05-323574 | A | 12/1993 |
| JP | H09-260820 | A | 10/1997 |
| JP | 2002-187374 | A | 7/2002 |
| JP | 2003-29393 | A | 1/2003 |
| JP | 2005-293851 | A | 10/2005 |
| JP | 2008-282834 | A | 11/2008 |
| KR | 10-2007-0104196 | A | 10/2007 |
| KR | 10-1493306 | B1 | 2/2015 |
| KR | 10-2017-0119271 | A | 10/2017 |
| KR | 10-1908915 | B1 | 10/2018 |
| KR | 10-2020-0102350 | A | 8/2020 |
| KR | 10-2245399 | B1 | 4/2021 |

OTHER PUBLICATIONS

Chinese Office Action Issued on Jul. 24, 2025, in Counterpart Chinese Patent Application No. 202210704270.5 (10 Pages in English, 10 Pages in Chinese).

Chinese Office Action Issued on May 25, 2026, in Counterpart Chinese Patent Application No. 202210704270.5 (5 Pages in English, 5 Pages in Chinese).

* cited by examiner

900
L
730
100
710
720
730
700
320
500
JA
NJA
310
200
JA
730
720
710
D1
D2

900
L
730
100
710
720
730
700
320
500
JA
NJA
310
200
JA
710
730
720
D1
D2

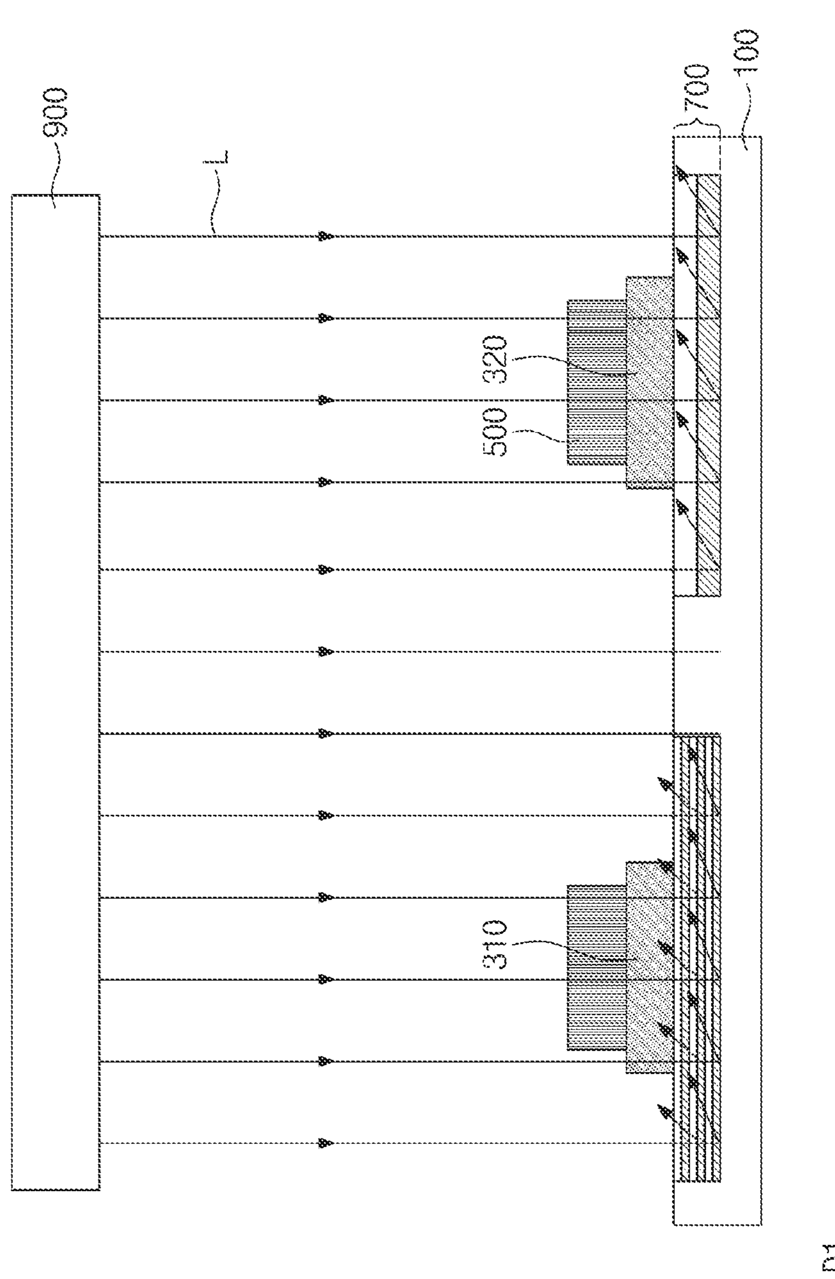
FIG. 13
900
L
700
100
320
500
310
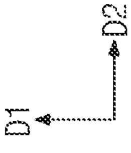
D1
D2

900
L
100
700
200
320
500
310
D1
D2

LASER CONTROL STRUCTURE AND LASER BONDING METHOD USING THE SAME

CROSS-REFERENCE TO RELATED APPLICATIONS

This U.S. non-provisional patent application claims priority under 35 U.S.C. § 119 of Korean Patent Application Nos. 10-2021-0080104, filed on Jun. 21, 2021 and 10-2022-0073094 filed on Jun. 15, 2022, the entire contents of which are hereby incorporated by reference.

BACKGROUND

The present disclosure herein relates to a laser light source control structure and a laser bonding method using the same, and more particularly, to a laser bonding method that may be used for bonding semiconductor elements and the like.

The advancement of the electronic industry brings with it a rising demand for highly functional, faster, and smaller electronic components. In line with this trend, connectors connecting chips with substrates have become smaller as well.

Solder bumps or the like may be used to connect the chips with the substrates. To make sure that the chip are connected with the substrates through the solder bumps, heat may need to be applied. When heat is applied upon a packaging process, parts may lose their functions (e.g., warpage due to a difference in coefficient of thermal expansion between respective parts, or breakage of a portion of each part).

In conventional thermocompression laser bonding processes, the difference in the coefficient of thermal expansion between a substrate and an element causes warpage, and the semiconductor element and the substrate are heated and pressurized, resulting in hardly performing a selective bonding process. Recently, applications of flexible substrates/elements are rapidly rising, and in this process, damage to the substrates/elements due to heat is caused upon a high-temperature soldering process only to allow low-temperature soldering, leading to a decrease in reliability. A bonding process technology that overcomes those shortcomings is a laser assisted bonding (LAB) process.

Laser is currently being used in the soldering field instead of a conventional soldering process to manufacture highly integrated electric circuits and to prevent structural defects due to thermal effects, and laser soldering is used to bond printed circuit board (PCB), central processing unit (CPU) connectors, RF/HP boards, and various sensors in the electric/electronic, semiconductor, and automobile fields. The laser soldering is beneficial in that portions affected by heat are reduced to the minimum, and fine microstructures are formed by rapid heating and cooling of solder. In addition, soldering in narrow spaces is available using laser beams that may be precisely aimed at target points, and due to non-contact bonding and low heat input, intermetallic compounds are less generated at a bonding interface, and thermal stress is low. On the other hand, since absorptivity or reflectance of the laser beams is different for each material, precise control of the laser beams is required.

Recently, an environmentally friendly process has been in the spotlight due to environmental issues, and the need to develop a process for flexibly coping with a demand for small quantity batch production and custom-made special parts in the electrical and electronic field is on the rise. In order to meet these practical demands, research on precision laser processing technology for application to the electric/electronic, semiconductor, and automobile industries is underway.

SUMMARY

The present disclosure provides a laser bonding method capable of performing high-temperature soldering even at low laser power since light-to-heat conversion efficiency of a laser light source is solely dependent on a substrate and a bonding object upon a laser bonding process.

The present disclosure also provides a laser bonding method that is dependent on beam size of a laser surface light source upon a laser bonding process to prevent thermal deformation or deterioration, which is caused when the same laser power is applied to an element or a portion where bonding is not required.

The present disclosure also provides a laser bonding method that simplifies processes through a single irradiation of laser to bonding regions having different melting points.

The present disclosure relates to a laser bonding method. An embodiment of the inventive concept provides a laser bonding method including: forming bonding portions on a substrate; providing a bonding object onto the bonding portions; providing a laser control structure onto the bonding object or the substrate; irradiating a laser toward the bonding object and the bonding portions; controlling quantity of laser light absorbed through the laser control structure; using the controlled quantity of laser light to heat the bonding portions and the bonding object to a bonding temperature; and bonding the bonding portions and the bonding object, wherein the laser control structure includes: a first substrate including a first region and a second region; a first thin film laminate on the first region; and a second thin film laminate on the second region, wherein: the first thin film laminate includes at least one first thin film layer and at least one second thin film layer, which are laminated on the first region; the second thin film laminate includes at least one third thin film layer and at least one fourth thin film layer, which are laminated on the second region; reflectance or absorptivity of the first thin film laminate with respect to laser is different from reflectance or absorptivity of the second thin film laminate; and the bonding temperature varies according to the quantity of laser light.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIGS. 7A to 15 are cross-sectional views showing a laser bonding method according to embodiments of the inventive concept.

DETAILED DESCRIPTION

Figure 1:
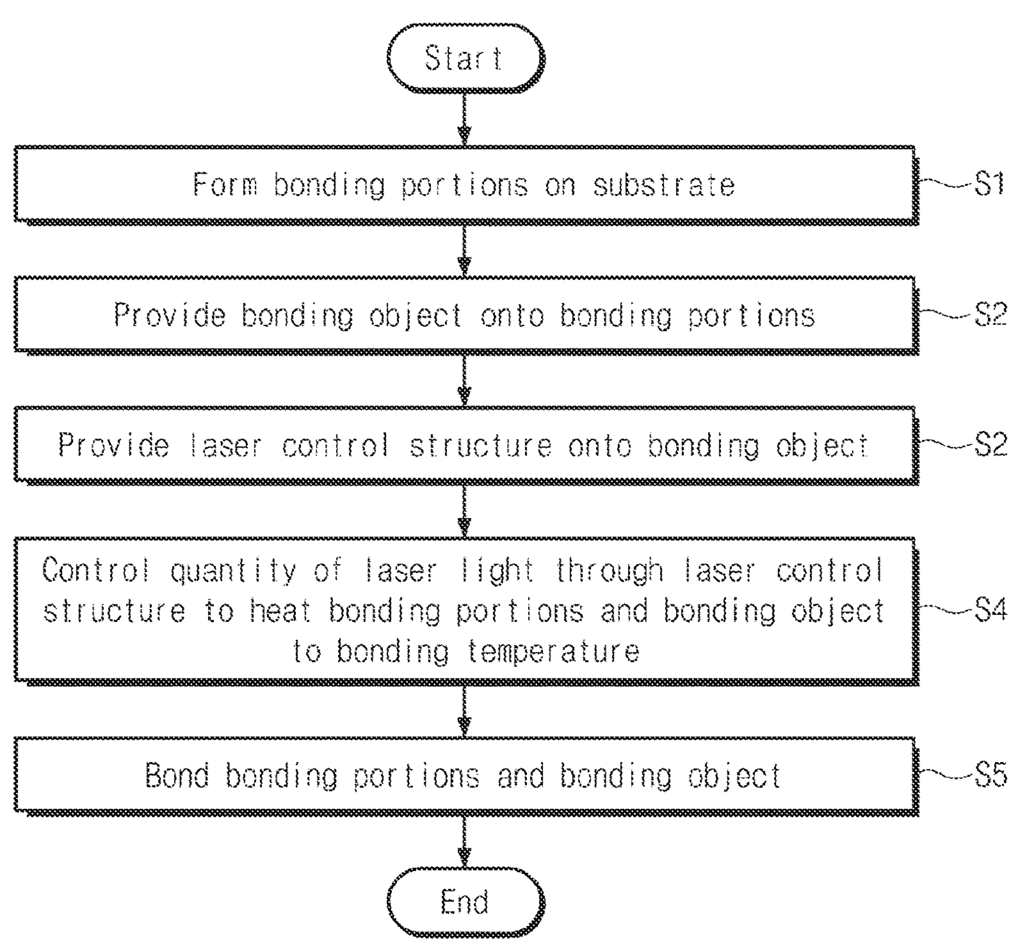
FIG. 1 is a flowchart showing a laser bonding method according to an embodiment of the inventive concept.

In order to fully understand the configuration and effects of the inventive concept, preferred embodiments of the inventive concept will be described below in more detail with reference to the accompanying drawings.

The inventive concept may be embodied in different forms and variously modified and changed, and should not be constructed as limited to the embodiments set forth herein. Rather, these embodiments are provided so that this disclosure will be thorough and complete, and will fully convey the scope of the inventive concept to those skilled in the art. In the drawings, the sizes of respective elements are exaggerated for convenience of description, and the ratios of respective elements may be exaggerated or reduced.

The terminology used herein is not for delimiting the embodiments of the inventive concept but for describing the embodiments. Unless otherwise defined, all terms used herein have the same meaning as commonly understood by one of ordinary skill in the art to which this invention pertains.

The terms of a singular form may include plural forms unless otherwise specified. It will be further understood that the terms "comprises" and/or "comprising", when used 'in this description, specify the presence of stated elements, steps, operations, and/or components, but do not preclude the presence or addition of one or more other elements, steps, operations, and/or components.

It will be understood that when a layer is referred to as being 'on' another layer, it can be formed directly on an upper surface of another layer, or a third layer may be interposed therebetween.

Though terms like a first, and a second are used to describe various regions and layers in the present description, the regions and the layers are not limited to these terms. These terms are used only to tell one region or layer from another region or layer. Therefore, a portion referred to as a first portion in one embodiment may be referred to as a second portion in another embodiment. An embodiment described and exemplified herein includes a complementary embodiment thereof. Like reference numerals refer to like elements throughout.

Hereinafter, embodiments of a laser control structure and a laser bonding method using the same according to an embodiment of the inventive concept will be described in detail with reference to FIGS. 1 to 17.

Figure 7A:
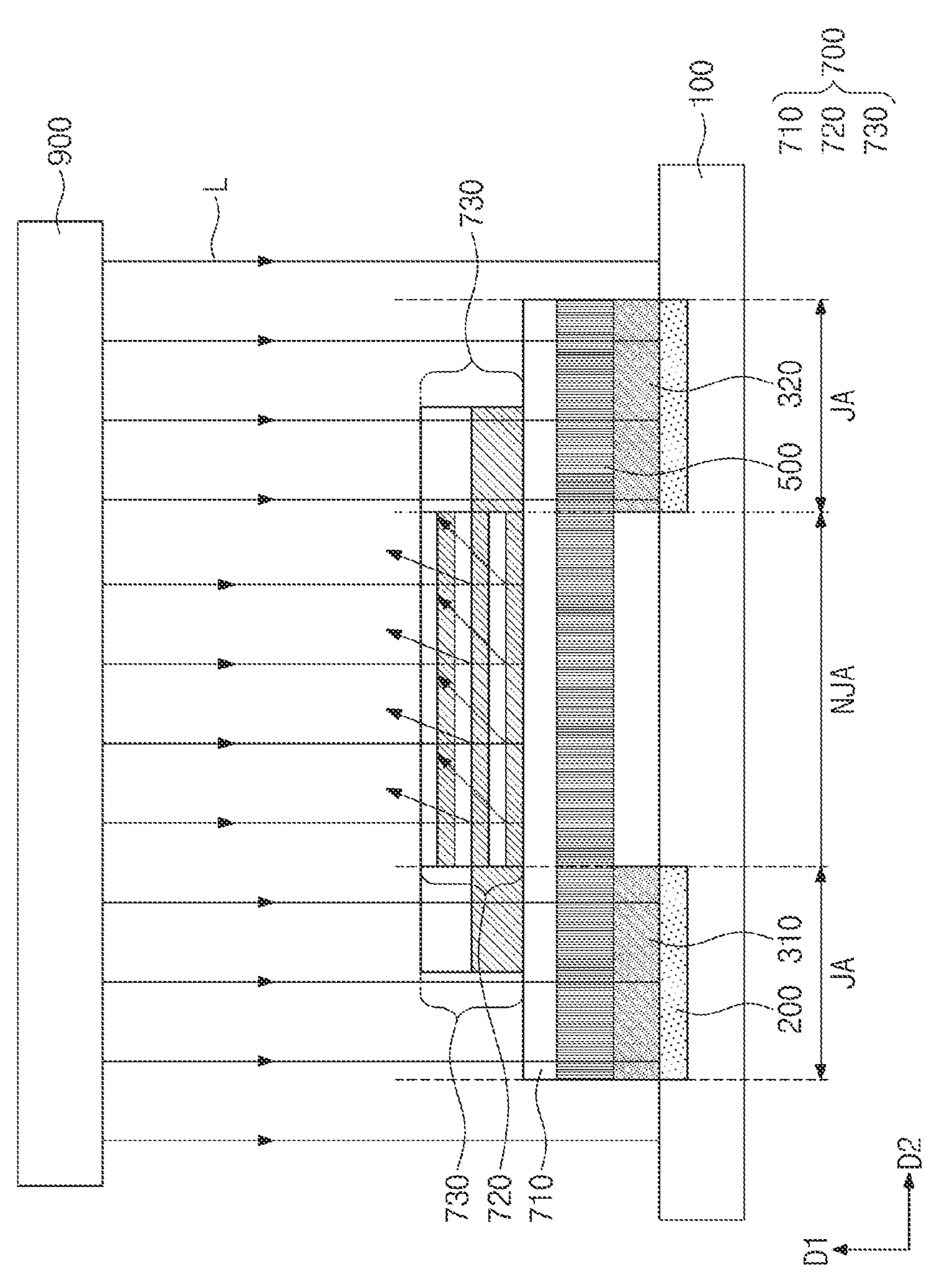
Figure 7B:
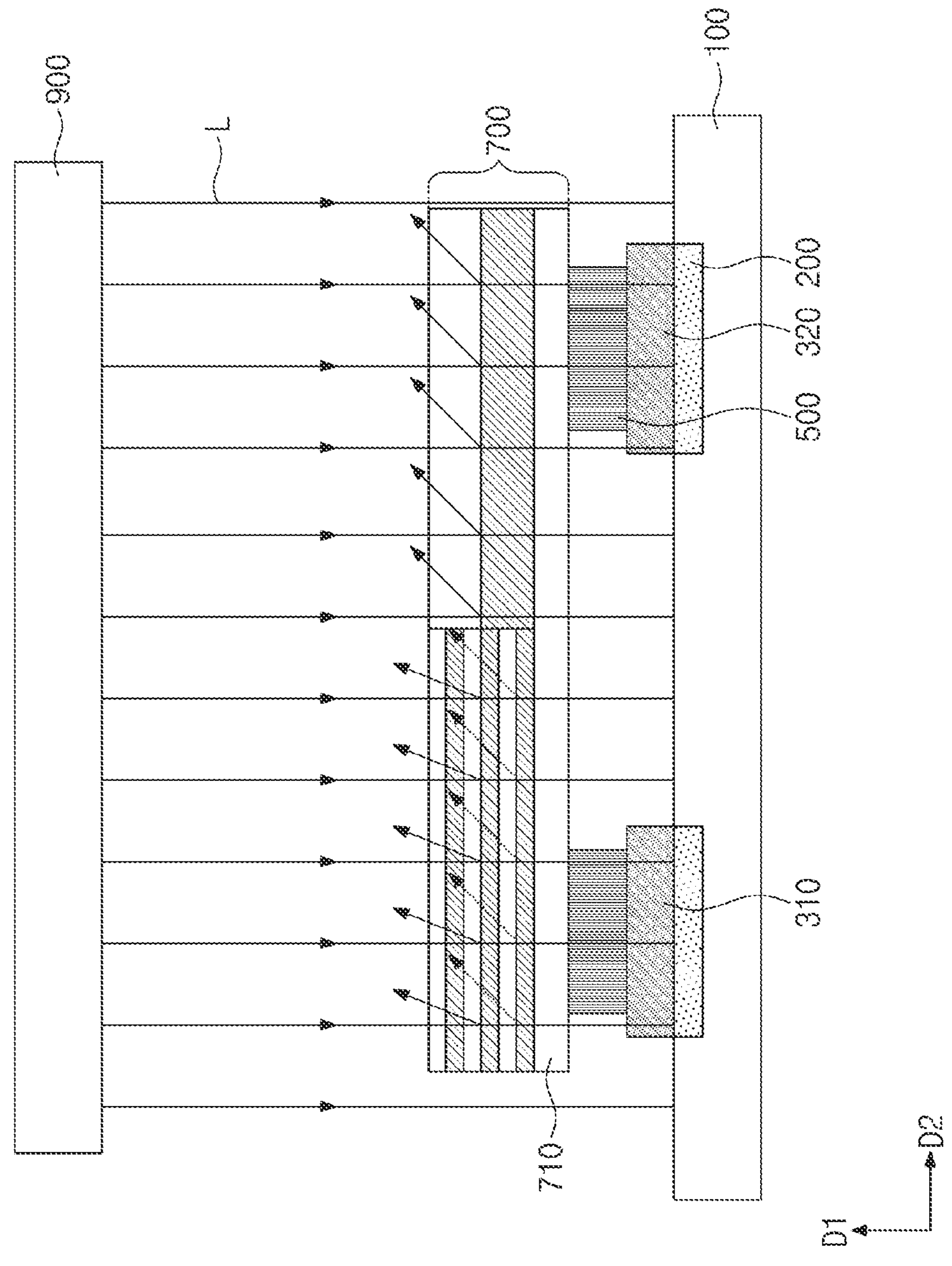

FIG. 1 is a flowchart showing a laser bonding method according to an embodiment of the inventive concept, and FIGS. 7A and 7B are cross-sectional views showing a laser bonding method according to an embodiment of the inventive concept. Hereinafter, a direction perpendicular to an upper surface of a substrate 100 is referred to as a first direction D1, and a direction parallel to the upper surface of the substrate 100 is referred to as a second direction D2.

Referring to FIG. 1, the laser bonding method according to an embodiment of the inventive concept may include forming bonding portions on a substrate (S1), providing a bonding object onto the bonding portions (S2), providing a laser control structure onto the bonding object (S3), controlling quantity of laser light absorbed through the laser control structure, using the controlled quantity of laser light to heat the bonding portions and the bonding object to a bonding temperature (S4), and bonding the bonding portions and the bonding object (S5).

Referring to FIGS. 1 and 7A, the forming of bonding portions on a substrate (S1) is a process of forming bonding portions 310 and 320 on upper pads 200 provided on the upper surface of the prepared substrate 100. The substrate 100 may include, for example, a printed circuit board (PCB). The upper pads 200 may be provided on the upper surface of the substrate 100. The upper pads 200 may include a conductive material. The upper pads 200 may include a metal material. For example, the upper pads 200 may include copper (Cu) or aluminum (Al). External components of the substrate 100 and circuits inside the substrate 100 may be electrically connected to each other through the upper pads 200. The meaning of connection as used herein may include both direct connection and indirect connection through other components. A plurality of upper pads 200 may be provided. The upper pads 200 may be spaced apart from each other in the second direction D2.

The bonding portions 310 and 320 may be provided on the upper surface of the substrate 100. More specifically, the bonding portions 310 and 320 may be formed on the upper surfaces of the upper pads 200. The bonding portions 310 and 320 may be provided in the form of a paste or a film. The bonding portions 310 and 320 may include a base resin, a reducing agent, a curing agent, and a catalyst.

The base resin may include a thermosetting resin. The base resin may include an epoxy resin, phenoxy, bismaleimide, unsaturated polyester, urethane, urea, phenol-formaldehyde, vulcanized rubber, a melamine resin, polyimide, an epoxy novolac resin, cyanate ester, an oxetane resin, an acrylic resin, a vinyl resin, or a combination thereof.

The reducing agent may remove an oxide film of solder powder included in the bonding portions 310 and 320. The reducing agent may include a carboxyl group. The reducing agent may include formic acid, acetic acid, lactic acid, glutamic acid, oleic acid, rosolic acid, 2,2-bis(hydroxymethylene)propanoic acid, butanoic acid, propanoic acid, tannic acid, gluconic acid, valeric acid, hexanoic acid, hydrobromic acid, hydrochloric acid, uric acid, hydrofluoric acid, sulfuric acid, benzyl glutaric acid, glutaric acid, malic acid, phosphoric acid, oxalic acid, uranic acid, hydrochloric acid, perchloric acid, gallic acid, phosphorous acid, citric acid, malonic acid, tartaric acid, phthalic acid, cinnamic acid, hexanoic acid, propionic acid, stearic acid, ascorbic acid, acetyl salicylic acid, azelaic acid, bezilic acid, fumaric acid, glutamine, amino acid, or a combination thereof.

The curing agent may cause a curing reaction with the base resin. The curing agent may include amine, aromatic amine, alicyclic amine, phenalkamine, imidazole, carboxylic acid, anhydride, a polyamide-based curing agent, a phenolic curing agent, PMDA, and a waterborne curing agent, or a combination thereof.

The catalyst may control reaction rate of the reaction. The catalyst may include 1-methyl imidazole, 2-methyl imidazole, dimethylbenzyl imidazole, 1-decyl-2-methylimidazole, benzyl dimethyl amine, trimethyl amine, triethyl amine, diethylamino propylamine, pyridine, 18-diazocyclo [5,4,0]undec-7-ene, 2-heptadecylimidazole, boron trifluoride mono, or a combination thereof.

The bonding portions 310 and 320 may include a conductive material. For example, the bonding portions 310 and 320 may include a conductive filler. The conductive filler may be a solder of tin, silver, copper, lead, indium, bismuth (Bi), cadmium, antimony, gallium, arsenic, germanium, zinc, aluminum, gold, silicon, nickel, phosphorus, or a combination thereof. The conductive filler may include tin, silver, copper, lead, indium, bismuth (Bi), cadmium, antimony, gallium, arsenic, germanium, zinc, aluminum, gold, silicon, nickel, phosphorus, or an alloy of Bi/33In, Sn/52In, Sn50In, Sn/58Bi, Sn/20Bi/10In, Sn/8Zn/3Bi, Sn/9Zn, Sn/Ag3.0/Cu0.5, Sn/2Ag, Sn/3.8/0.7Cu as a combination thereof. In this case, the volume fill factor may be about 0% to about 50%. The bonding portions 310 and 320 may include a metal material as a conductive material.

The bonding portions 310 and 320 may include non-conductive particles, thermal acid generators, photoacid generators, sensitizers, alumina, silica, aluminum nitride, silicon carbide, dyes, carbon black, graphene, carbon nanotubes, or a combination thereof. In this case, the content may be about 0% to about 30%. The non-conductive particles may control the distance between the substrate 100 and a bonding object 500. The non-conductive particles may prevent conduction of the adjacent bonding portions 310 and 320.

Referring to FIGS. 1 and 7A, the providing of a bonding object onto bonding portions (S2) is a process of providing the bonding object 500 onto upper surfaces of the bonding portions 310 and 320. For example, the bonding object 500 may include a semiconductor chip, a sensor element, a solar cell element, or an optical element. Lower pads may be provided on a lower surface of the bonding object 500. That is, the bonding portions 310 and 320 may be interposed between the lower pads and the upper pads 200 of the substrate 100. The lower pads in the second direction D2 may have a smaller width than the bonding portions 310 and 320 in the second direction D2. Accordingly, a portion of the upper surfaces of the bonding portions 310 and 320 may be exposed. The lower pads may include a conductive material. The lower pads may include a metal material. For example, the lower pads may include any conductive material such as copper (Cu) or aluminum (Al). The lower pads may be depressed in the first direction D1 from the lower surfaces of the bonding objects 500. A plurality of lower pads may be provided. The lower pads may be spaced apart from each other in the second direction D2.

Referring to FIGS. 1 and 7A, the providing of a laser control structure onto a bonding object (S3) is a process of providing a laser control structure 700 onto the bonding object 500 or the substrate 100. The laser control structure 700 may be provided to be in contact with an upper surface of the bonding object 500. In addition, the laser control structure 700 may be provided to be spaced apart from the bonding object 500 in the first direction D1. That is, the laser control structure 700 may be interposed between a surface light source 900 and the bonding object 500 of a laser bonding device. The bonding object 500 may not be directly exposed to a laser L by the laser control structure 700. Accordingly, in a bonding process which will be described later, the bonding object 500 may be protected from a heat source. The laser control structure 700 may include a first substrate 710, a first thin film laminate 720, and a second thin film laminate 730. The laser control structure 700 may convert the laser L absorbed through the surface light source 900 into thermal energy to control thermal energy delivered to the bonding portions 310 and 320. In addition, the laser control structure 700 may be a photomask.

Referring to FIGS. 1 and 7A, the laser control structure 700 may include a first substrate 710 including a first region NJA and a second region JA, a first thin film laminate 720 on the first region NJA, and a second thin film laminate 730 on the second region JA. The first region NJA may correspond to a non-bonding region on the substrate 100. The second region JA may correspond to a bonding region on the substrate 100.

The first substrate 710 including the first region NJA and the second region JA may include a material having high transmittance of the laser L applied from the surface light source 900. For example, the first substrate 710 may include polydimethylsiloxane (PDMS), glass, quartz, or a combination thereof. The first substrate 710 may include a thermally conductive material. The first substrate 710 may have a thickness of about 1 μm to about 100 mm.

The first thin film laminate 720 may be provided on the first region NJA, and the second thin film laminate 730 may be provided on the second region JA. A region in which the second thin film laminate 730 is not provided may be present on the second region JA. The first thin film laminate 720 may include at least one first thin film layer 721 and at least one second thin film layer 722, which are laminated on the first region NJA. The first thin film layer 721 and the second thin film layer 722 may be alternately laminated. A structure in which the first and second thin film layers 721 and 722 are alternately laminated may be repeated and provided. The first and second thin film layers 721 and 722 may include $SiO_2$, $SiN_x$, metal, ceramic, or a combination thereof. The first and second thin film layers 721 and 722 may include cesium tungsten oxide (CWO), lanthanum hexaboride, indium tin oxide (ITO), antimony-doped tin oxide (ATO), or a combination thereof. The first and second thin film layers 721 and 722 may be formed through an ALD, PVD, CVD deposition process, a solution coating process, or a photolithography process. The first and second thin film layers 721 and 722 may have a thickness of about 100 μm to about 0 μm.

The second thin film laminate 730 may include at least one third thin film layer 731 and at least one fourth thin film layer 732, which are laminated on the second region JA. The third thin film layer 731 and the fourth thin film layer 732 may be alternately laminated. The third and fourth thin film layers 731 and 732 may include $SiO_2$, $SiN_x$, metal, ceramic, or a combination thereof. The third and fourth thin film layers 731 and 732 may include cesium tungsten oxide (CWO), lanthanum hexaboride, indium tin oxide (ITO), antimony-doped tin oxide (ATO), or a combination thereof. The third thin film layer 731 may include the same material as the first thin film layer 721, and the fourth thin film layer 732 may include the same material as the second thin film layer 722. The third and fourth thin film layers 731 and 732 may be formed through an ALD, PVD, CVD deposition process, a solution coating process, or a photolithography process. The third and fourth thin film layers 731 and 732 may have a thickness of about 100 μm to about 0 μm. The third thin film layer 731 may have a thickness different from that of the first thin film layer 721, and the fourth thin film layer 732 may have a thickness different from that of the second thin film layer 722.

The first and second thin film laminates 720 and 730 may reflect or absorb wavelength band of the laser L applied from the surface light source 900. Specifically, the first thin film layer 721 and the second thin film layer 722 of the first thin film laminate 720 may be formed of different materials. Accordingly, the refractive indices of the first thin film layer 721 and the second thin film layer 722 with respect to the laser L may be different. The laser L may be reflected due to a difference in refractive index at an interface between the first thin film layer 721 and the second thin film layer 722, which are adjacent to each other. The more the first and second thin film layers 721 and 722 are laminated, the greater the reflection of the laser L may be. In addition, the first thin film layer 721 and the second thin film layer 722 are formed of different materials, and the absorptivity for the laser L may be different. The more the first and second thin film layers 721 and 722 are laminated, the lower the absorption efficiency of the laser L at the interface between the thin film layers 721 and 722 may be. The third thin film layer 731 and the fourth thin film layer 732 of the second thin film laminate 730 may be formed of different materials. Accordingly, how the first thin film laminate 720 works may be equally applied.

Each of the first and second thin film laminates 720 and 730 varies the number of laminated thin film layers 721, 722, 731, and 732, and reflectance or absorptivity of the laser L for each region on the first substrate 710 may thus be controlled. The first and second thin film laminates 720 and 730 may be provided to be adjacent to each other on the first substrate 710. In addition, the first and second thin film laminates 720 and 730 may be provided to be spaced apart from each other on the first substrate 710 in the second direction D2. In this case, the reflectance or absorptivity of the laser L may be controlled for each region on the first substrate 710 by varying the positions of the respective first and second thin film laminates 720 and 730. The reflectance or absorptivity of the laser L may be controlled for each region on the first substrate 710 by varying the thicknesses of the respective first and second thin film laminates 720 and 730. Specifically, as the thickness of each of the thin film layers 721, 722, 731, and 732 constituting the thin film laminates 720 and 730 increases, the reflection and absorptivity of the laser L may decrease. This is because materials inside the thin film layers 721, 722, 731, and 732 may be obstacles that prevent the performance of the laser L.

The laser control structure 700 may further include an interposer. The interposer may be interposed between the first substrate 710 and the first and second thin film laminates 720 and 730. The interposer may be a microcircuit board, and may physically connect the first substrate 710 with the first and second thin film laminates 720 and 730.

Referring to FIGS. 1 and 7A, the controlling of quantity of laser light absorbed through a laser control structure, and the using of the controlled quantity of laser light to heat bonding portions and a bonding object to a bonding temperature (S4) may include controlling quantity of laser L light absorbed through a laser control structure, and using the adjusted quantity of laser L light to heat the bonding portions 310 and 320 and the bonding object 500 to a bonding temperature.

The controlling of the quantity of laser L light is a process of controlling via the first thin film laminate 720 on the first region NJA and the second thin film laminate 730 on the second region JA. The quantity of laser light may be defined as the magnitude of light energy of the laser L applied from the surface light source 900. That is, the quantity of laser light, as the magnitude of light energy, may be proportional to an amount of laser applied and absorbed from a surface light source. The first thin film laminate 720 may be a high-reflection (HR) thin film laminate. The first thin film laminate 720 may reflect the applied laser L with a high reflectance. Accordingly, the laser L may not be applied onto the first region NJA. That is, the laser L may not be applied to the bonding object 500 in the first region NJA. The second thin film laminate 730 may be an anti-reflection (AR) thin film laminate. The second thin film laminate 730 may reflect the applied laser L with a lower reflectance than the first thin film laminate 720. That is, the quantity of reflected laser L light may be reduced, and the quantity of non-reflected laser L light may be absorbed by the bonding object 500. Accordingly, the laser L may be applied onto the second region JA.

The quantity of laser L light applied from the surface light source 900 may be controlled through the first and second thin film laminates 720 and 730. Accordingly, the quantity of laser L light delivered to the bonding object 500 and the bonding portions 310 and 320 may be controlled. An abnormal high temperature phenomenon that may be caused in the bonding object 500 due to the applied laser L may be prevented. In addition, defects or damage to a bonding object (e.g., a semiconductor device) upon the laser bonding process may be prevented from being caused.

The using of the controlled quantity of laser L light to heat the bonding portions 310 and 320 and the bonding object 500 to a bonding temperature is a process of heating to a bonding temperature that does not damage the bonding object 500. The bonding object 500 and the bonding portions 310 and 320 may absorb the laser L applied through the laser control structure 700. The bonding object 500 and the bonding portions 310 and 320 may convert the absorbed laser L into heat. Accordingly, the temperature of the bonding object 500 and the bonding portions 310 and 320 may increase. The bonding temperature may be a temperature at which damage or a defect is not caused in the bonding object 500 and at which the bonding portions 310 and 320 and the bonding object 500 are bonded. That is, the bonding object 500 may be heated to a target bonding temperature by using the laser control structure 700.

Referring to FIGS. 1 and 7A, the bonding of bonding portions and bonding objects (S5) is a process of bonding the bonding portions 310 and 320 and the bonding object 500 at a heated bonding temperature. At the target bonding temperature, the bonding object 500 and the bonding portions 310 and 320 may be bonded. Accordingly, laser bonding may be allowed without damage to the bonding object 500.

Figure 8A:
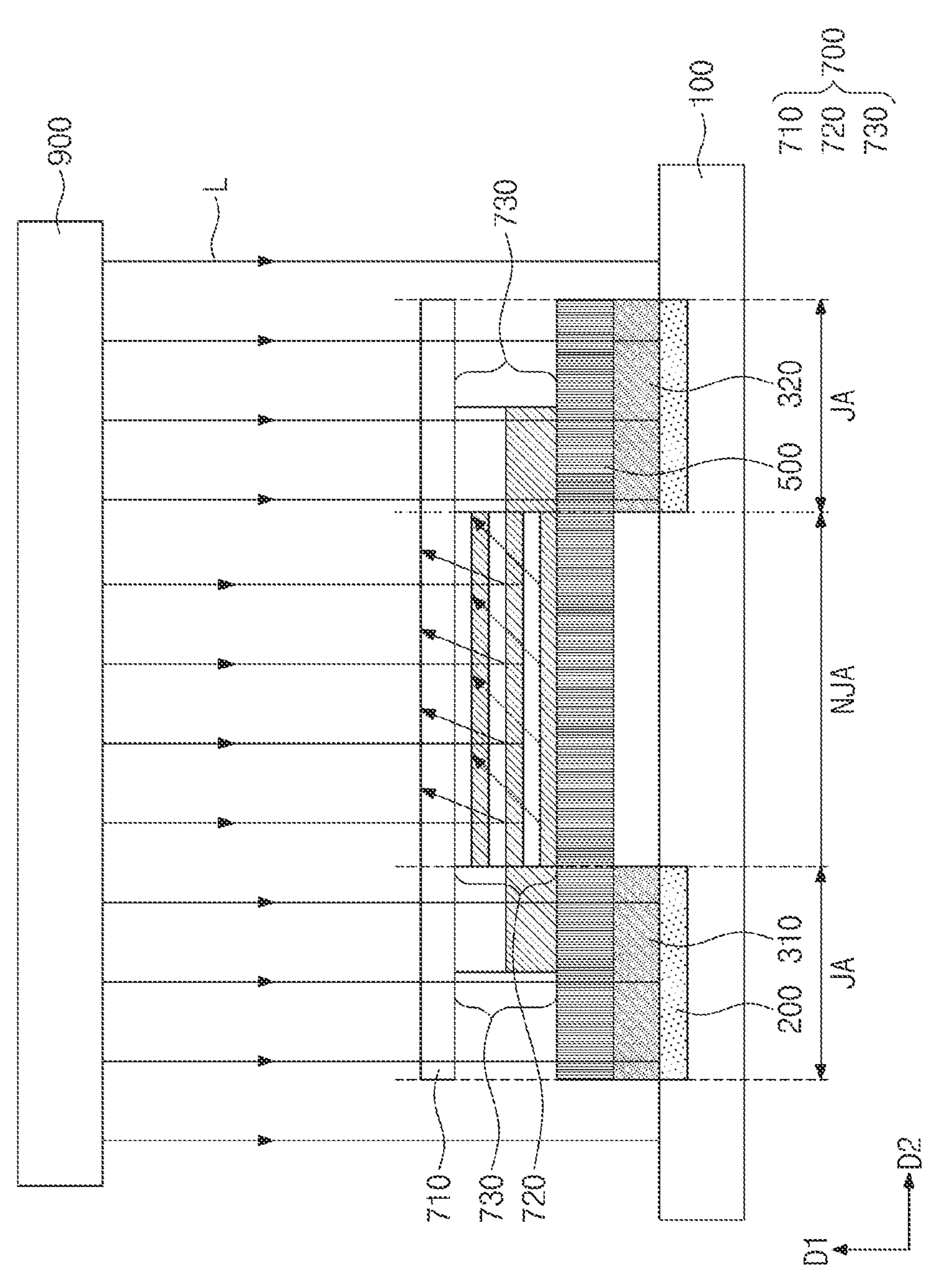

In the present embodiment, descriptions of technical features duplicated with those described above with reference to FIGS. 1 and 7A will be omitted, and the difference will be described in detail. Referring to FIGS. 7A and 8A, the thin film laminates 720 and 730 of the laser control structure 700 may be provided below the first substrate 710. The thin film laminates 720 and 730 may be provided at any position capable of controlling the laser L applied from the surface light source 900.

Figure 2:
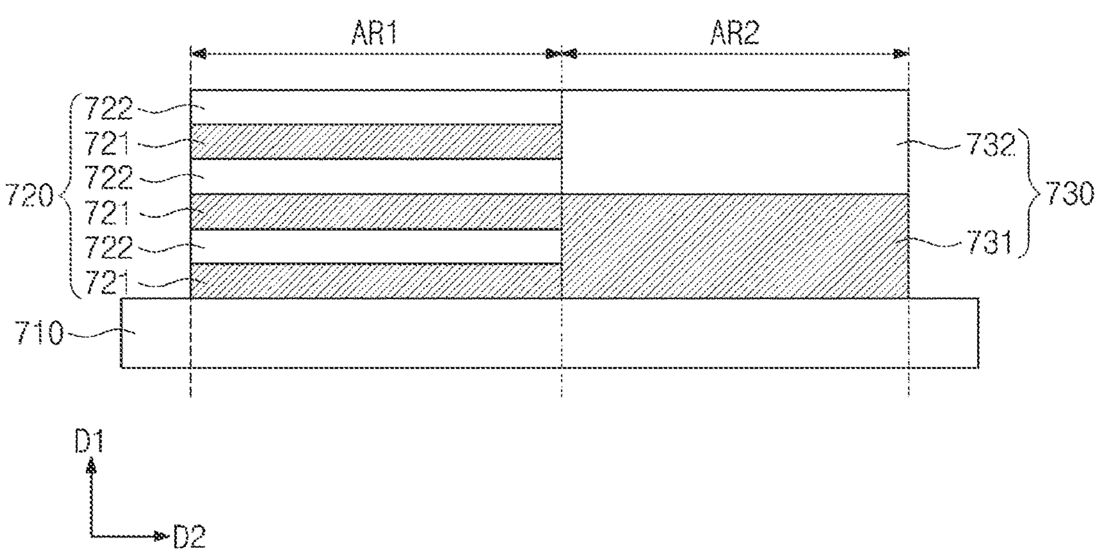
FIGS. 2 to 4 are cross-sectional views showing a laser control structure according to embodiments of the inventive concept.

Referring to FIG. 7B, the laser control structure 700 may alter reflectance or absorptivity of the laser L through the first and second thin film laminates 720 and 730 of FIG. 2. That is, the reflectance or absorptivity of each of the first and second thin film layers may be different. Accordingly, thermal energy delivered to each of the bonding portions 310 and 320 may be different. That is, according to the thermal energy delivered by the first thin film laminate 720 (FIG. 2), the first bonding portion 310 may be heated to a first temperature, and according to the thermal energy delivered by the second thin film laminate 730 (FIG. 2), the second bonding portion 320 may be heated to a second temperature. The first temperature and the second temperature may be different.

Referring back to FIG. 7B, a plurality of bonding objects 500 may be provided. The plurality of bonding objects 500 may correspond to a first sub bonding object and a second sub bonding object. That is, the first and second sub bonding objects may correspond to the first and second bonding portions 310 and 320, respectively. A bonding temperature at which each sub bonding object is heated may be different. The temperature at which the first bonding portion 310 and the first sub bonding object are heated may be a first bonding temperature, and the temperature at which the second bonding portion 320 and the second sub bonding object are heated may be a second bonding temperature.

The first bonding portion 310 may fix the first sub bonding object to the substrate 100 at the first temperature heated using the delivered thermal energy. The second bonding portion 320 may fix the second sub bonding object to the substrate 100 at the second temperature heated using the delivered thermal energy. Accordingly, the bonding objects 500 having different melting points may be bonded through a single bonding process. That is, the process time may be shortened to increase efficiency of the bonding method. In addition, controlling reflectance or absorptivity for each region to which the laser L is applied through the laser control structure 700 may prevent thermal damage and warpage of surrounding components. Controlling thicknesses of the thin film laminates 720 and 730 (FIG. 4) for each region to which laser is applied, or arranging positions of the thin film laminates 720 and 730 (FIG. 3) may increase light-to-heat conversion efficiency to allow selective laser bonding.

FIGS. 8B to 15 are cross-sectional views showing a laser bonding method according to another embodiments. The descriptions in FIGS. 1, 2, 7A, and 7B are substantially the same as for the substrate 100, the upper pad 200, the bonding portions 310 and 320, the bonding objects 500, the surface light source 900, and the laser L, and hereinafter, descriptions in overlapping ranges will be omitted.

Figure 8B:
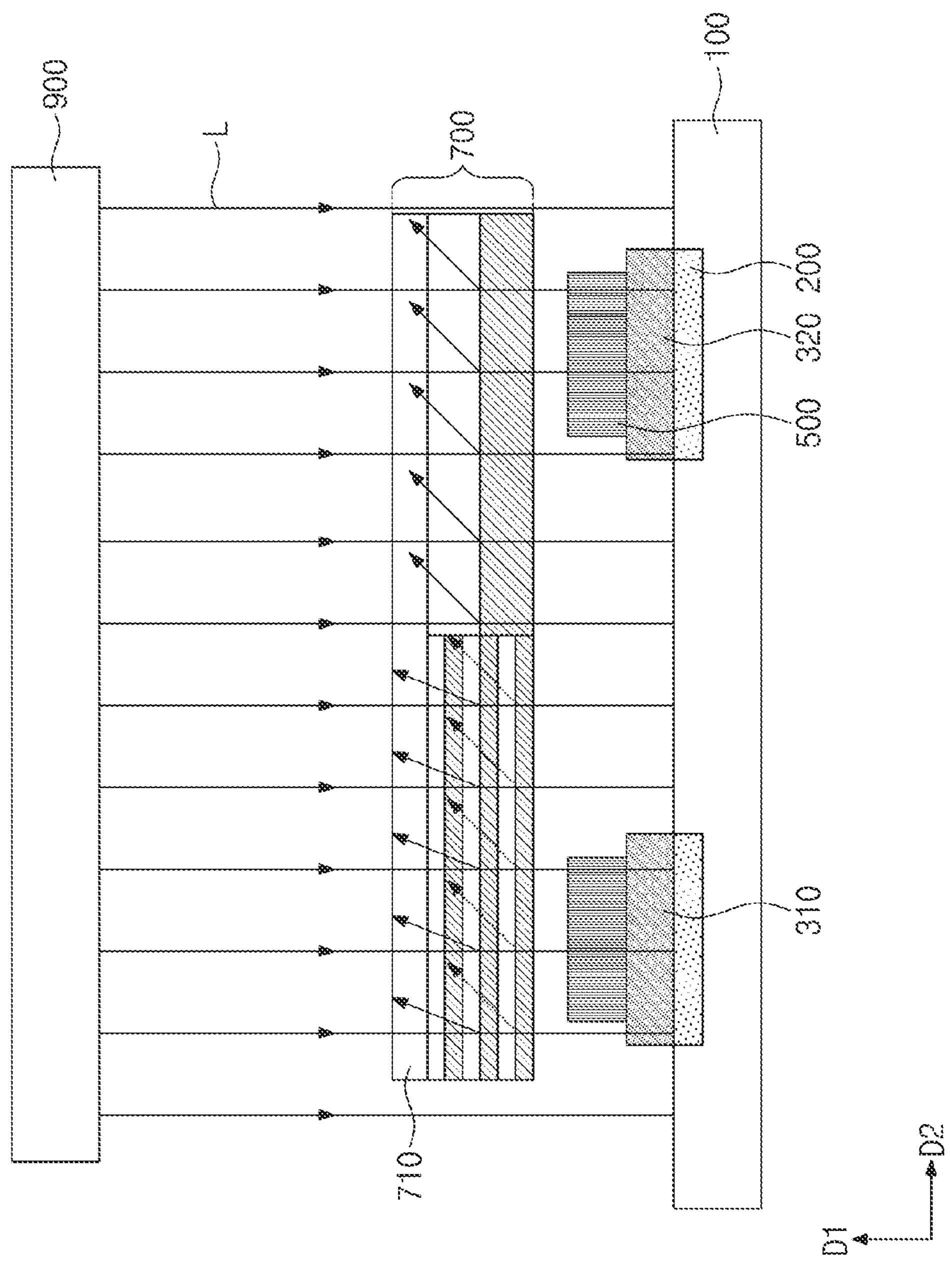

Referring to FIG. 8B, the laser control structure 700 may include a first substrate 710 and first and second thin film laminates provided on a lower surface of the first substrate 710. The first and second thin film laminates may be provided to be spaced apart from upper surfaces of the bonding objects 500 in the first direction D1. The first substrate 710 may include a material having high transmittance of the laser L. Accordingly, the laser control structure as in the present embodiment may be provided.

Figure 3:
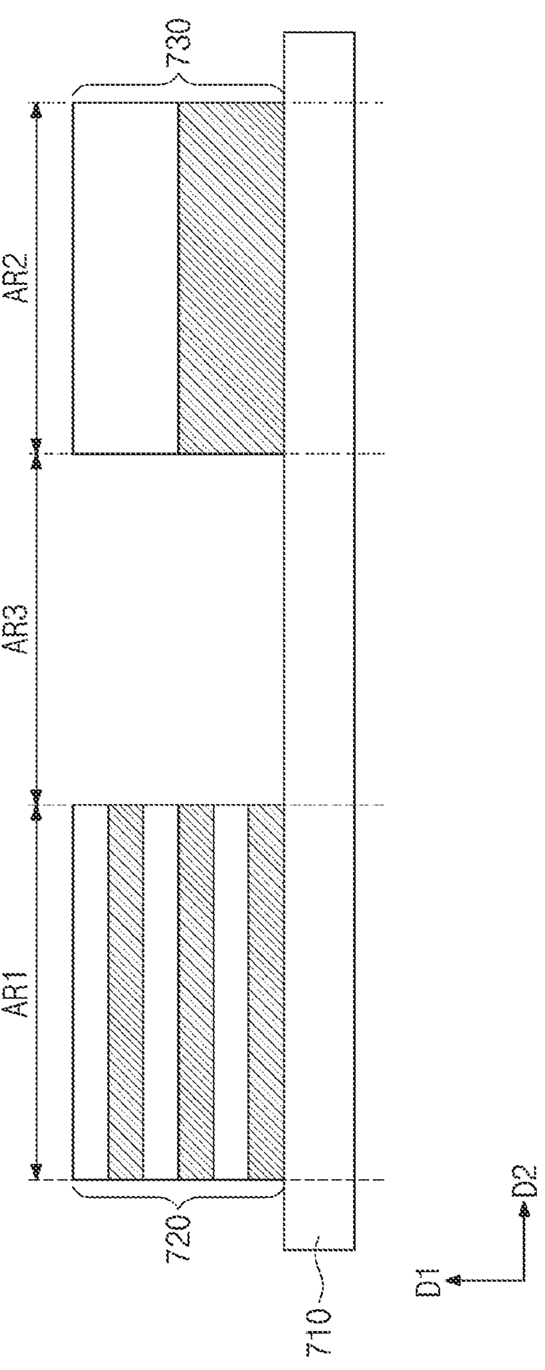
Figure 9:
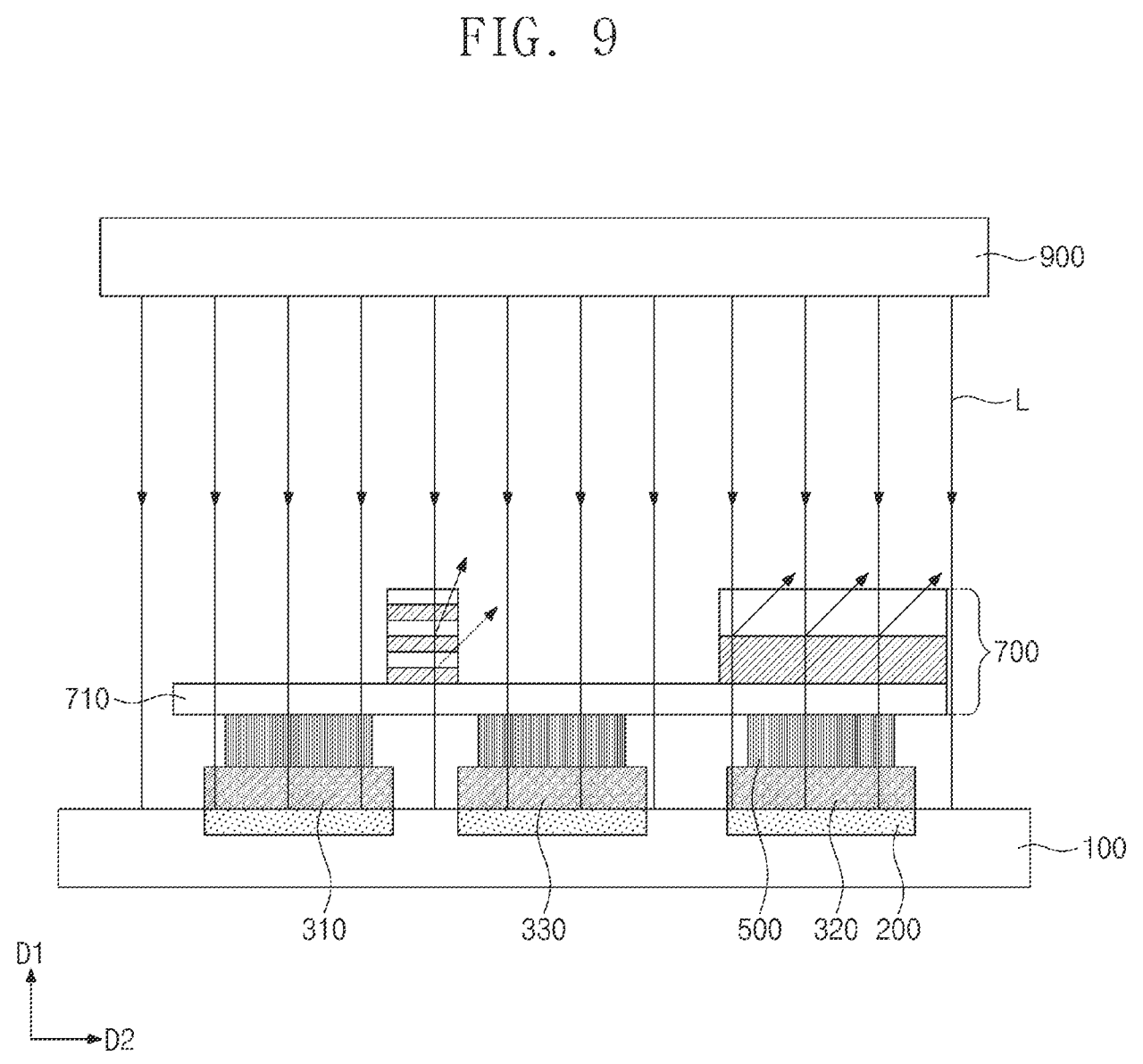

Referring to FIGS. 3 and 9, the laser control structure 700 may include a first substrate 710 and first and second thin film laminates 720 and 730 provided on an upper surface of the first substrate 710. The first substrate 710 may include a first region AR1, a second region AR2, and a third region AR3. The first and second thin film laminates 720 and 730 may be provided to be spaced apart in the second direction D2. In this case, a region in which the thin film laminates 720 and 730 are not provided is referred to as the third region AR3. Since thermal energy delivered to each of the bonding portions 310, 320, and 330 disposed below the first region AR1, the second region AR2, and the third region AR3 is different, the bonding portions 310, 320, and 330 having different melting points may be bonded through a single process. More specifically, where the bonding portions are crowded, reflectance may be reduced through a thin film laminate to increase thermal energy delivered to bonding portions. That is, the bonding object 500 may be bonded at a low temperature. Where there are no bonding portions, reflectance may be increased through a thin film laminate to lower thermal energy absorbed by bonding portions. That is, the temperature rise due to irradiation of the laser L may be minimized.

Figure 4:
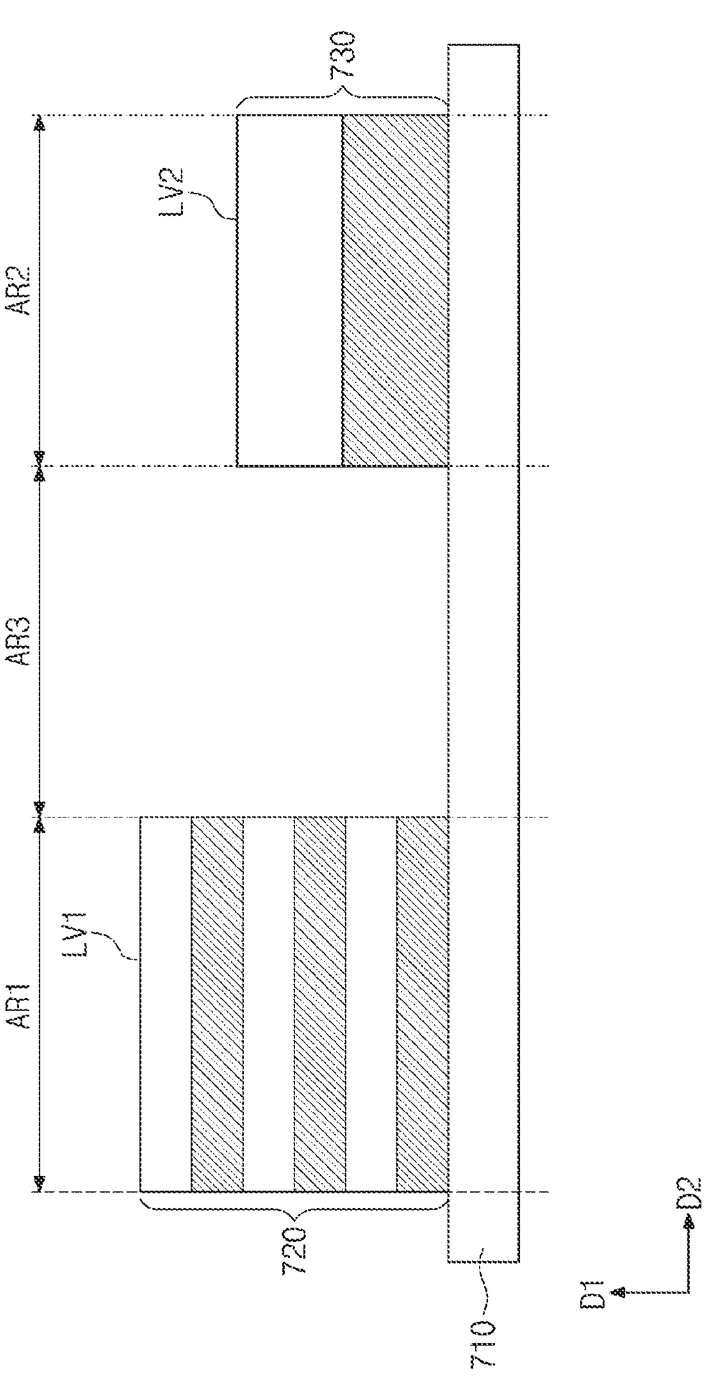
Figure 10:
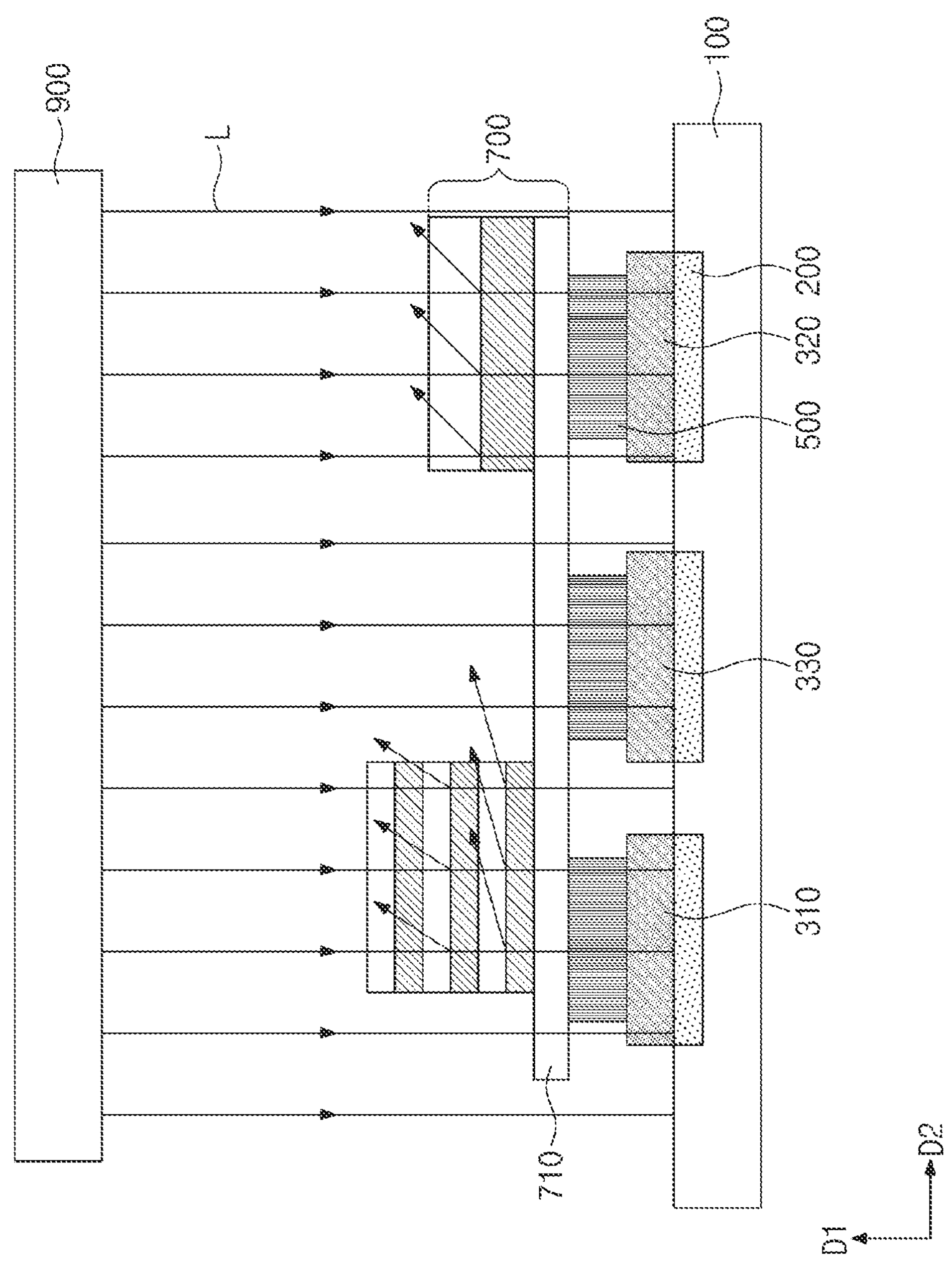

Referring to FIGS. 4 and 10, the laser control structure 700 may include a first substrate 710 and first and second thin film laminates 720 and 730 provided on an upper surface of the first substrate 710. The first substrate 710 may include a first region AR1, a second region AR2, and a third region AR3. The first and second thin film laminates 720 and 730 may be provided to be spaced apart in the second direction D2. In this case, a region in which the thin film laminates 720 and 730 are not provided is referred to as the third region AR3. The upper surface of the first thin film laminate 720 may have a height LV1 greater than a height LV2 of the upper surface of the second thin film laminate 730. Since thermal energy delivered to each of the bonding portions 310 and 320 disposed below the first region AR1 and the second region AR2 is different, the bonding portions 310 and 320 having different melting points may be bonded through a single process. According to the present embodiment, as in FIG. 9, since thermal energy delivered to each of the bonding portions 310, 320, and 330 disposed below the first region AR1, the second region AR2, and the third region AR3 is different, the bonding portions 310, 320, and 330 having different melting points may be bonded through a single process.

Figure 5:
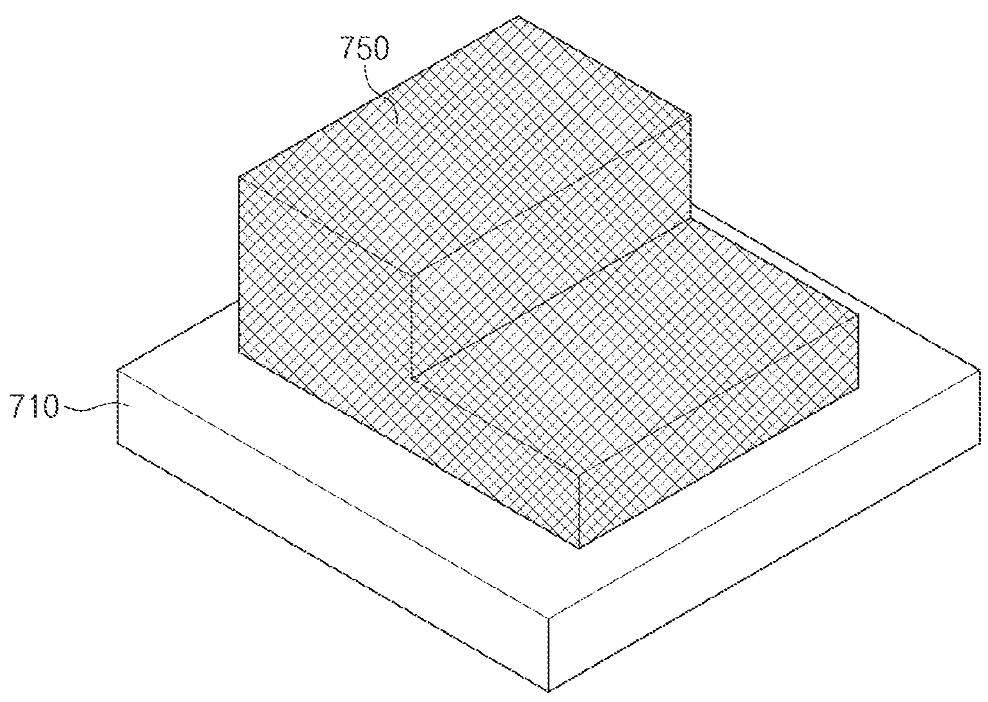
FIG. 5 is a perspective view showing a patterned laser control structure according to an embodiment of the inventive concept.
Figure 6A:
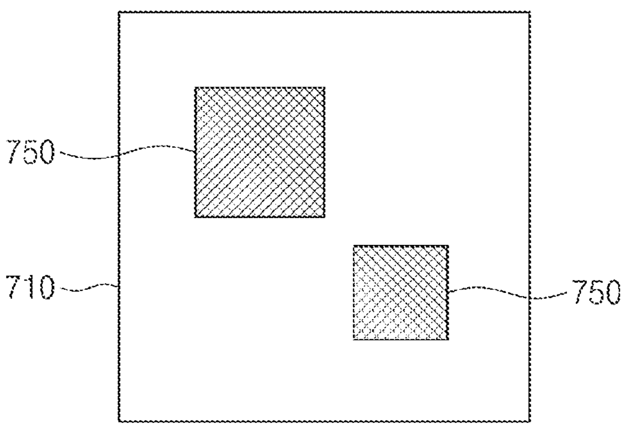
FIGS. 6A to 6D are plan views showing a patterned laser control structure according to embodiments of the inventive concept.
Figure 6B:
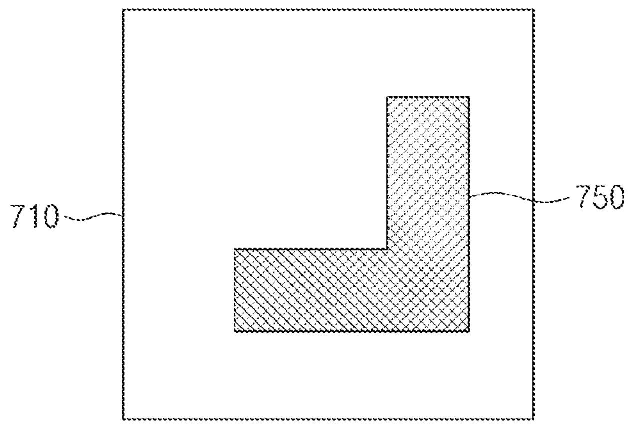
Figure 6C:
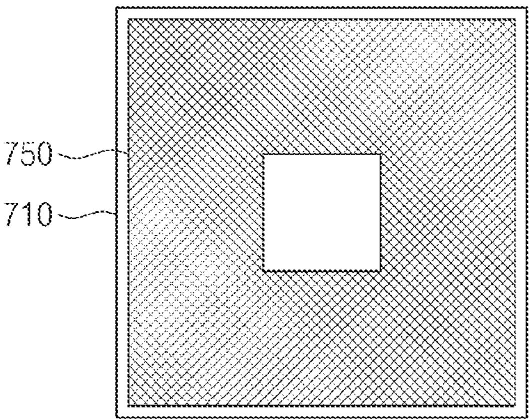
Figure 6D:
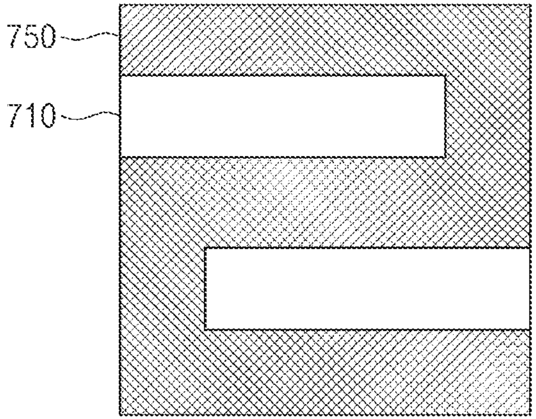

FIG. 5 is a perspective view showing a patterned laser control structure according to an embodiment of the inventive concept, and FIGS. 6A to 6D are plan views showing a patterned laser control structure according to embodiments of the inventive concept. FIG. 10 is a cross-sectional view showing a laser bonding method according to another embodiment.

Referring to FIGS. 5, 6A to 6D, and 10, the laser control structure 700 may include a first substrate 710 and a patterned thin film laminate 750. The patterned thin film laminate 750 may be formed through a CMP process or a photolithography process. Through this process, the thickness of a thin film laminate for each region of the first substrate 710 may be controlled. Referring back to FIGS. 6A to 6D, the laser control structure 700 may include a thin film laminate 750 patterned in various forms. A region in which the thin film laminate 750 patterned on the first substrate 710 is provided may correspond to the first region AR1 or the second region AR2 of FIG. 4. A region in which the thin film laminate 750 patterned on the first substrate 710 is not provided may correspond to the third region AR3 of FIG. 4.

Figure 11:
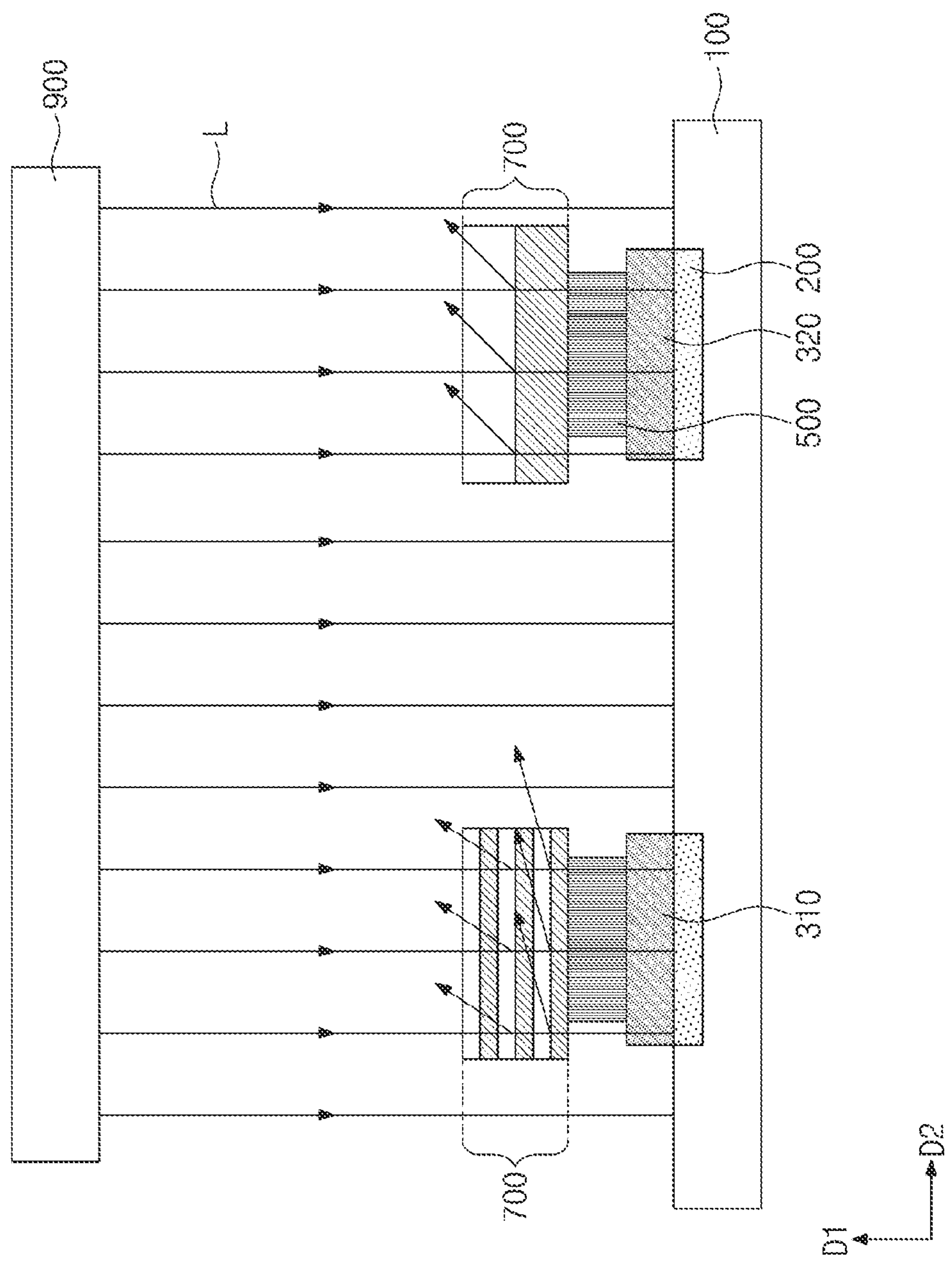
Figure 12:
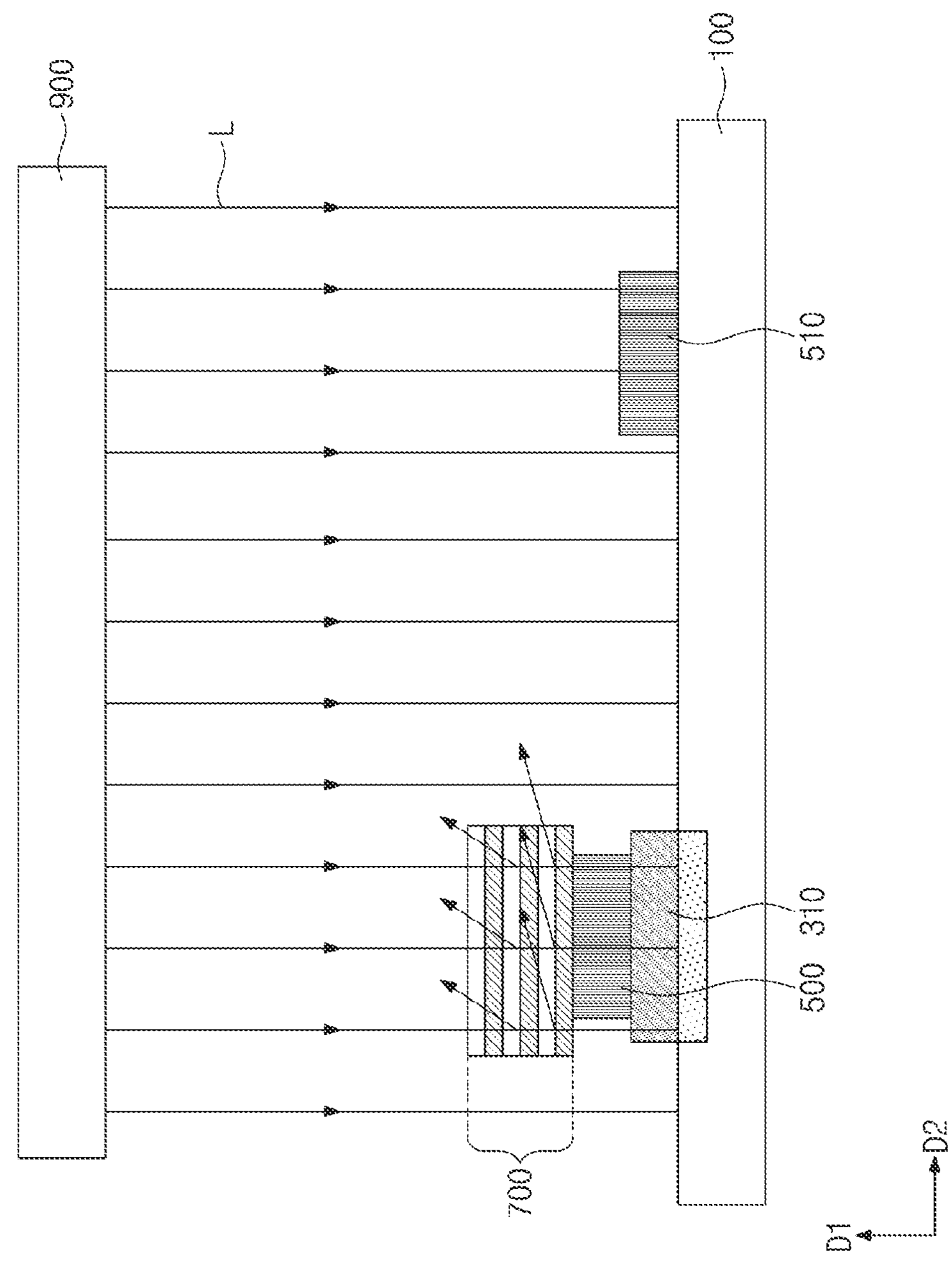

Referring to FIGS. 11 and 12, the laser control structure 700 may include the first and second thin film laminates 720 and 730 of FIG. 3. In this case, the first and second thin film laminates 720 and 730 of FIG. 3 may be provided without the first substrate 710 of FIG. 7. Referring back to FIG. 12, a pre-bonded bonding object 510 may be provided on the substrate 100. In this case, the laser control structure 700 may be provided on the non-bonded bonding object 500. That is, the bonding portions 310 and 320 having different melting points may be bonded through a single bonding process.

Figure 14:
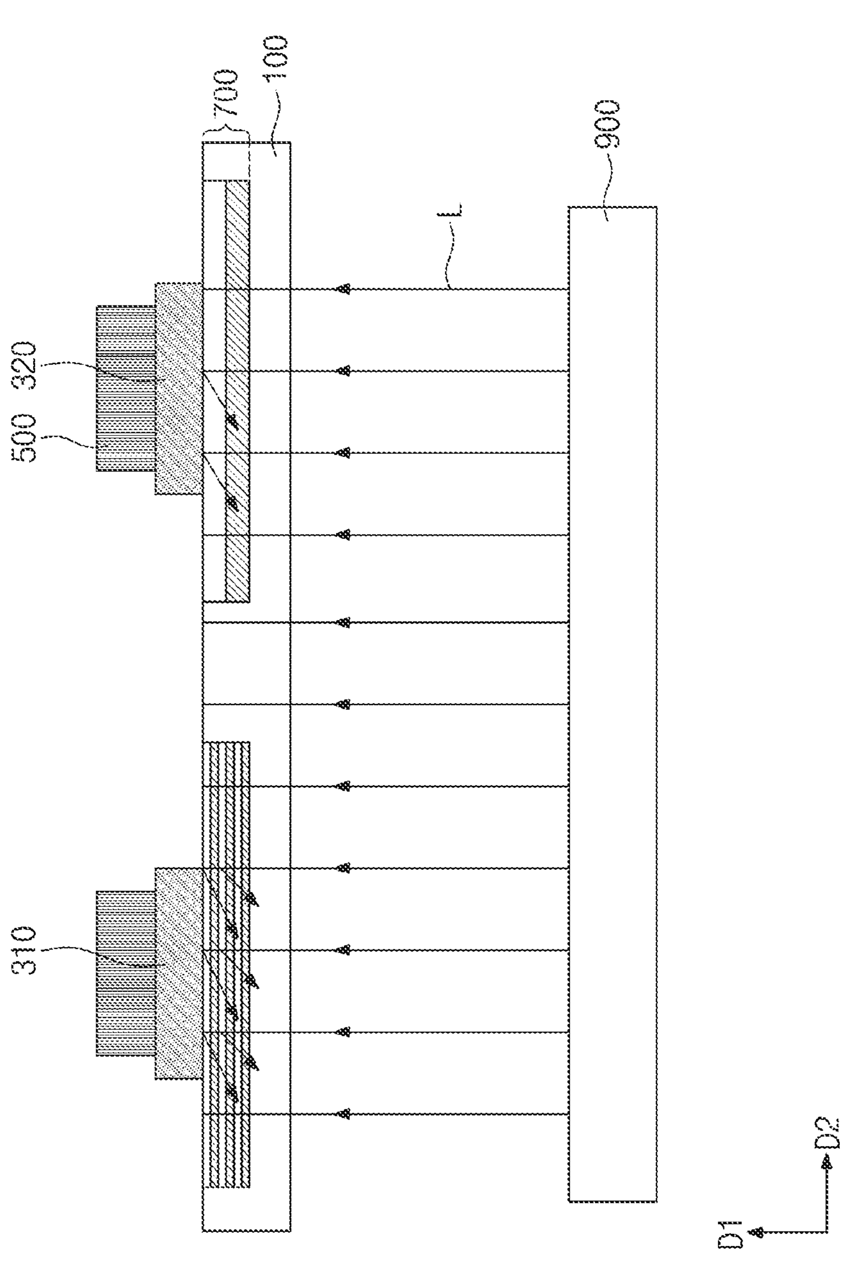

Referring to FIG. 13, the laser control structure 700 may be provided on the substrate 100. That is, the laser control structure 700 may be interposed between the substrate 100 and lower portions of the first and second bonding portions 310 and 320. Referring to FIG. 14, the laser control structure 700 may be provided on the substrate 100. That is, the laser control structure 700 may be interposed between the substrate 100 and lower portions of the first and second bonding portions 310 and 320. In this case, the surface light source 900 of a laser bonding device may be provided below the substrate 100. Referring back to FIG. 14, according to an embodiment of the inventive concept, the bonding objects 500 may not be directly exposed to the laser L as compared with the embodiment of FIG. 13. Accordingly, the bonding objects 500 may be protected from a heat source.

Figure 15:
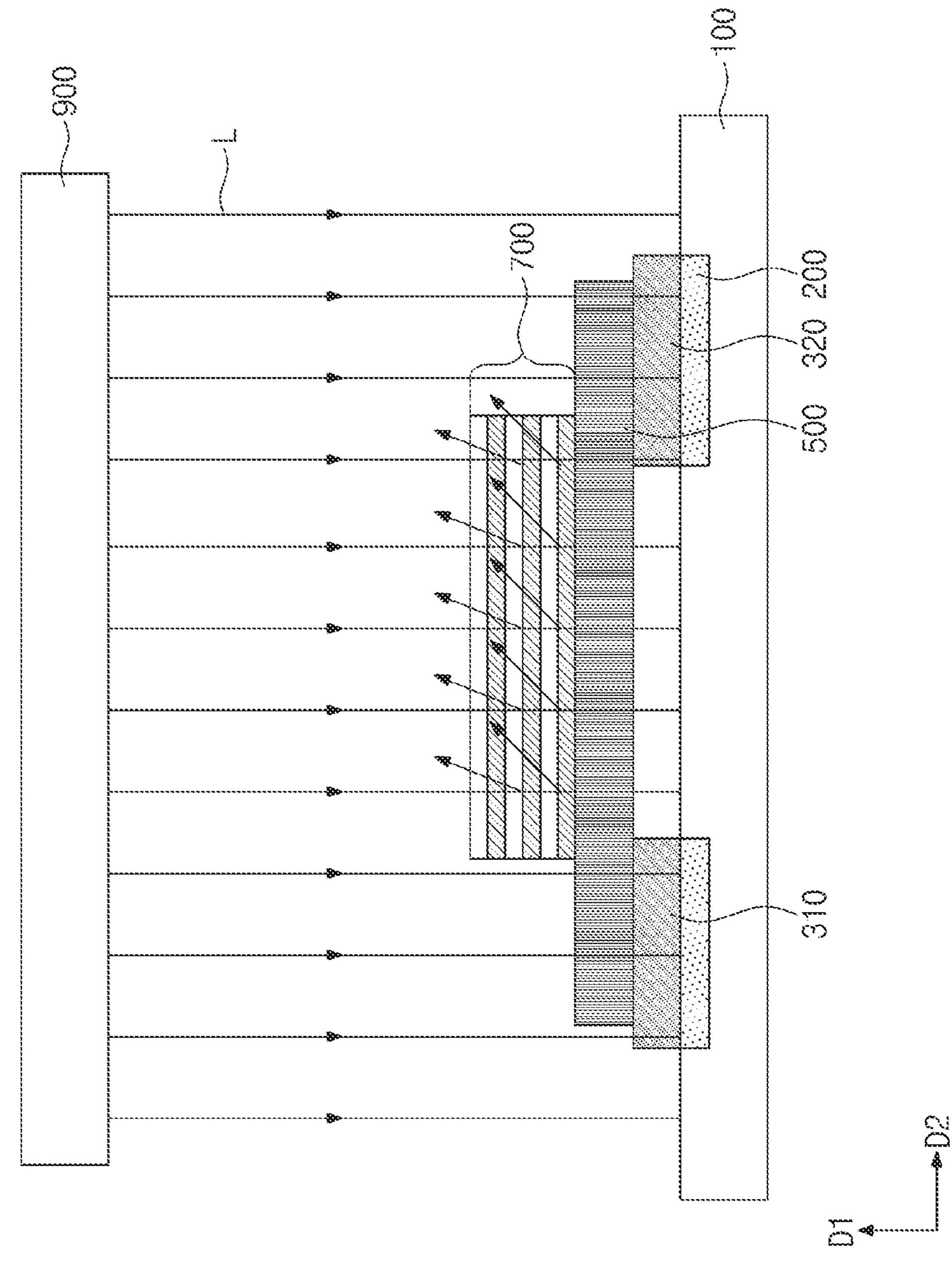

Referring to FIG. 15, one bonding object 500 may be provided on the first and second bonding portions 310 and 320, which are adjacent. The adjacent first and second bonding portions 310 and 320 may be provided to be spaced apart in the second direction D2. The close arrangement of the first and second bonding portions 310 and 320 may increase bonding process efficiency.

Example 11

$SiO_2$ was deposited with PECVD. A total of 4 samples (samples 1 to 4) of 10×10 mm in which thicknesses of thin films were varied were prepared through a semiconductor wet etching process using an $SiO_2$ etching solution. Reflectance of these samples corresponding to laser control structure thin film layers was measured using a UV-Vis spectrometer. A difference in reflectance according to the $SiO_2$ thickness was confirmed through Table 1 below.

TABLE 1

| Sample No. | 1 | 2 | 3 | 4 |
|---|---|---|---|---|
| Reflectance(%) | 46.44 | 22.85 | 18.87 | 15.78 |

A silicon chip on which a laser control structure thin film was deposited was pressed to bring a thermocouple into contact with a lower surface of the chip. A 980 nm laser was then directly applied onto an upper surface where a light reflection/absorption film was deposited, and thus the absorbed laser was converted into heat and delivered to the thermocouple. Light-to-heat converted temperature was measured.

Figure 16:
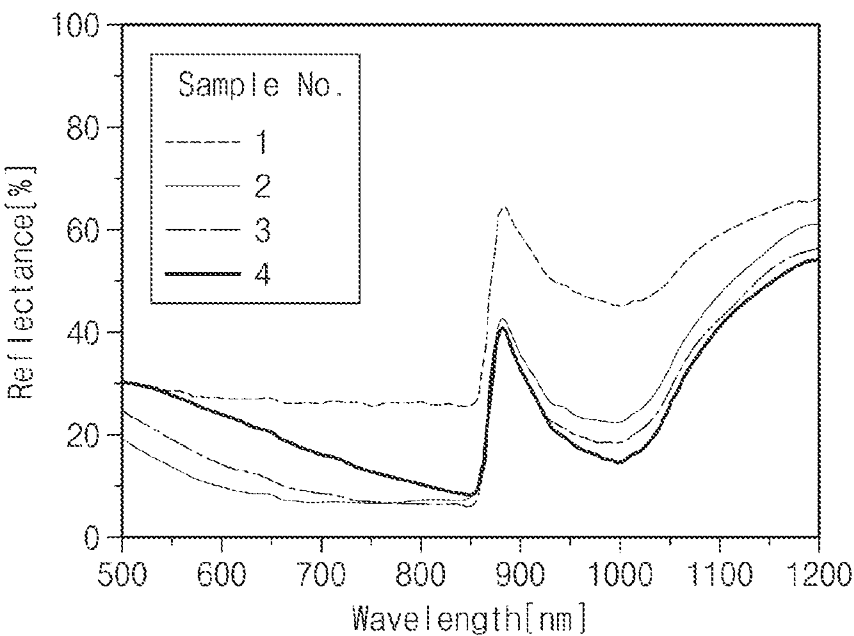
FIGS. 16 and 17 are graphs showing light-to-heat conversion efficiency according to embodiments of the inventive concept.
Figure 17:
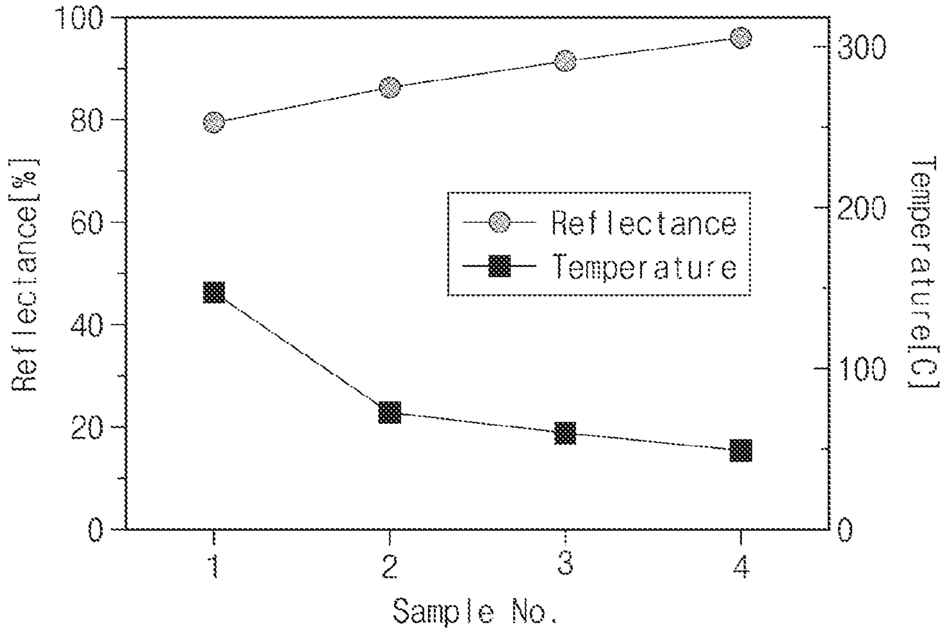

FIGS. 16 and 17 are graphs showing light-to-heat conversion efficiency according to embodiments of the inventive concept. Referring to FIGS. 16 and 17, 252° C. was measured at the thickness of a thin film having a highest reflectance and 305° C. was measured at the thickness of a thin film having a lowest reflectance. That is, the higher the reflectance, the less the amount of heat delivered by the laser, and thus the lower the temperature of a bonding portion. The lower the reflectance, the greater the amount of heat delivered by the laser, and thus the higher the temperature of a bonding portion.

Example 2

An epoxy siloxane resin (Hybrid Plasitics, EP0408.04.30) (24.1 wt %), a photoinitiator (UVI-6976) (1.2 wt %), cesium tungsten oxide particles (Alfa Aesar) (2.4 wt %), and propylene glycol methyl ether acetate (Sigma aldrich) (72.3 wt %) were mixed to prepare an infrared absorption coating solution for implementing an embodiment of a laser control structure thin film layer according to an embodiment of the inventive concept. The prepared infrared absorption coating solution was spin-coated on a quartz substrate and then dried at about 100° C. for about 10 minutes to form a coating film having a thickness of about 10 μm. Thereafter, through a photolithography process, a laser control structure thin film layer using infrared absorption coating was formed only on a specific portion on the quartz substrate. In the prepared laser control structure, transmittance was measured using a UV-Vis Spectrometer in the 1000 nm wavelength band of a portion where the laser control structure thin film layer was formed and of a portion where the laser control structure thin film layer was not formed. The transmittance was confirmed through Table 2 below.

TABLE 2

| Thin film thickness (μm) | 0 | 10 |
|---|---|---|
| Transmittance (%) | 92 | 34 |

When the laser control structure prepared according to an embodiment the inventive concept is used in the bonding process, light-to-heat conversion efficiency may be selectively controlled for a uniformly applied laser surface light source. Accordingly, bonding processes having different bonding conditions may be performed through a single laser irradiation.

According to an embodiment of a laser bonding method of the inventive concept, light-to-heat conversion efficiency may be controlled by regulating reflectance or absorptivity of a region to which laser is applied through a laser control structure. Controlling thickness of the laser-applied region or arranging laser control structure thin film layers may increase the light-to-heat conversion efficiency, thereby allowing selective laser bonding.

According to another embodiment of the laser bonding method of the inventive concept, thermal damage and warpage of surrounding components may be prevented by controlling reflectance or absorptivity of a region to which laser is applied through a laser control structure. In addition, bonding portions having different melting points may be bonded through a single laser bonding process to reduce the process time, resulting in increased efficiency.

The effects of the inventive concept are not limited to the aforesaid, but other effects not described herein will be clearly understood by those skilled in the art from descriptions below.

Although the embodiments of the inventive concept have been described above with reference to the accompanying drawings, those skilled in the art to which the inventive concept pertains may implement the inventive concept in other specific forms without changing the technical idea or essential features thereof. Therefore, it should be understood that the embodiments described above are exemplary in all respects and not restrictive.

What is claimed is:

1. A laser bonding method comprising:

forming bonding portions on a substrate;

providing a bonding object onto the bonding portions;

providing a laser control structure onto the bonding object or the substrate;

irradiating a laser using a surface light source toward the laser control structure;

controlling quantity of laser light absorbed through the laser control structure;

using the controlled quantity of laser light to heat the bonding portions and the bonding object to a bonding temperature; and bonding the bonding portions and the bonding object, wherein the laser control structure includes:

a first substrate including a first region and a second region;

a first thin film laminate on the first region; and a second thin film laminate on the second region, wherein:

the first thin film laminate includes a plurality of first thin film layers and a plurality of second thin film layers, which are alternately and repeatedly laminated on the first region, the second thin film laminate includes at least one third thin film layer and at least one fourth thin film layer, which are laminated on the second region, each of the first thin film layers and the third thin film layer comprise a first material, each of the second thin film layers and the fourth thin film layer comprise a second material different from the first material, a thickness of each of the first thin film layers is less than a thickness of the third thin film layer, a thickness of each of the second thin film layers is less than a thickness of the fourth thin film layer, a number of laminated first thin film layers is greater than a number of the third thin film layer, a number of laminated second thin film layers is greater than a number of the fourth thin film layers, reflectance or absorptivity of the first thin film laminate with respect to laser is different from reflectance or absorptivity of the second thin film laminate, and the bonding temperature varies according to the quantity of laser light absorbed.

2. The laser bonding method of claim 1, wherein:

the bonding portions comprise a first bonding portion and a second bonding portion;

the bonding object comprises a first sub bonding object and a second sub bonding object;

the heating to the bonding temperature comprises heating the first and second bonding portions and the first and second sub bonding objects to a first bonding temperature and a second bonding temperature, respectively, using the controlled quantity of laser light;

the bonding comprises bonding the first and second bonding portions and the first and second sub bonding objects, respectively; and the first bonding temperature resulting from the heating by the quantity of laser light is different from the second bonding temperature resulting from the heating by the quantity of laser light.

3. The laser bonding method of claim 1, wherein thicknesses of the first and second thin film laminates are different.

4. The laser bonding method of claim 1, wherein the first and second thin film laminates are patterned and provided.

5. The laser bonding method of claim 1, wherein the first substrate comprises polydimethylsiloxane (PDMS), glass, quartz, or a combination thereof.

6. The laser bonding method of claim 1, wherein the first to fourth thin film layers comprise $SiO_2$, $SiN_x$, metal, ceramic, or a combination thereof.

7. The laser bonding method of claim 1, wherein the first to fourth thin film layers comprise cesium tungsten oxide (CWO), lanthanum hexaboride, indium tin oxide (ITO), antimony tin oxide (ATO), or a combination thereof.

8. The laser bonding method of claim 1, wherein the bonding portions are in the form of a paste or a film, and include a base resin, a reducing agent, a curing agent, and a catalyst.

9. The laser bonding method of claim 8, wherein the bonding portions further comprise a conductive filler, the conductive filler including tin, silver, copper, lead, indium, bismuth (Bi), cadmium, antimony, gallium, arsenic, germanium, zinc, aluminum, gold, silicon, nickel, phosphorus, or a combination thereof.

10. The laser bonding method of claim 8, wherein the bonding portions further comprise non-conductive particles, thermal acid generators, photoacid generators, sensitizers, alumina, silica, aluminum nitride, silicon carbide, dyes, carbon black, graphene, carbon nanotubes, or a combination thereof.

11. The laser bonding method of claim 8, wherein the base resin comprises an epoxy resin, phenoxy, bismaleimide, unsaturated polyester, urethane, urea, phenol-formaldehyde, vulcanized rubber, a melamine resin, polyimide, an epoxy novolac resin, cyanate ester, an oxetane resin, an acrylic resin, a vinyl resin, or a combination thereof.

12. The laser bonding method of claim 8, wherein the reducing agent comprises formic acid, acetic acid, lactic acid, glutamic acid, oleic acid, rosolic acid, 2,2-bis(hydroxymethylene)propanoic acid, butanoic acid, propanoic acid, tannic acid, gluconic acid, valeric acid, hexanoic acid, hydrobromic acid, hydrochloric acid, uric acid, hydrofluoric acid, sulfuric acid, benzyl glutaric acid, glutaric acid, malic acid, phosphoric acid, oxalic acid, uranic acid, hydrochloric acid, perchloric acid, gallic acid, phosphorous acid, citric acid, malonic acid, tartaric acid, phthalic acid, cinnamic acid, hexanoic acid, propionic acid, stearic acid, ascorbic acid, acetyl salicylic acid, azelaic acid, bezilic acid, fumaric acid, glutamine, amino acid, or a combination thereof.

13. The laser bonding method of claim 8, wherein the curing agent comprises amine, aromatic amine, alicyclic amine, phenalkamine, imidazole, carboxylic acid, anhydride, a polyamide-based curing agent, a phenolic curing agent, PMDA, and a waterborne curing agent, or a combination thereof.

14. The laser bonding method of claim 8, wherein the catalyst comprises 1-methyl imidazole, 2-methyl imidazole, dimethylbenzyl imidazole, 1-decyl-2-methylimidazole, benzyl dimethyl amine, trimethyl amine, triethyl amine, diethylamino propylamine, pyridine, 18-diazocyclo[5,4,0]undec-7-ene, 2-heptadecylimidazole, boron trifluoride mono, or a combination thereof.

15. The laser bonding method of claim 1, wherein the bonding portions are between the bonding object and the laser control structure.

16. The laser bonding method of claim 1, wherein the laser control structure is in direct contact with the bonding object.

17. A laser control structure comprising:

a first substrate including a first region and a second region;

a first thin film laminate on the first region; and a second thin film laminate on the second region, wherein:

the first thin film laminate includes a plurality of first thin film layers and a plurality of second thin film layers, which are alternately and repeatedly laminated on the first region, the second thin film laminate includes at least one third thin film layer and at least one fourth thin film layer, which are laminated on the second region, each of the first thin film layers and the third thin film layer comprise a first material, each of the second thin film layers and the fourth thin film layer comprise a second material different from the first material, a thickness of each of the first thin film layers is less than a thickness of the third thin film layer, a thickness of each of the second thin film layers is less than a thickness of the fourth thin film layer, a number of first thin film layers is greater than a number of the third thin film layer, a number of second thin film layers is greater than a number of the fourth thin film layers, reflectance or absorptivity of the first thin film laminate with respect to laser is different from reflectance or absorptivity of the second thin film laminate, the first thin film laminate is provided on a first bonding portion such that the first bonding portion is heated to a first temperature by the laser, the second thin film laminate is provided on a second bonding portion such that the second bonding portion is heated to a second temperature by the laser, and the first temperature is different from the second temperature.

18. The laser control structure of claim 17, wherein the first and second thin film laminates are disposed spaced apart from each other on the first substrate.

19. The laser control structure of claim 17, wherein thicknesses of the first and second thin film laminates are different.

20. The laser control structure of claim 17, wherein the first and second thin film laminates are patterned and provided.

* * * * *